United States Patent
Ivey

[11] 3,900,089
[45] Aug. 19, 1975

[54] ONE WAY FLUID OPERATED COUPLING
[75] Inventor: John S. Ivey, Bloomfield, Mich.
[73] Assignee: Borg-Warner Corporation, Chicago, Ill.
[22] Filed: June 21, 1974
[21] Appl. No.: 481,945

[52] U.S. Cl............ 192/85 AA; 192/41 R; 192/47; 91/42; 188/82.9; 188/369
[51] Int. Cl............................................ F16d 25/00
[58] Field of Search............ 192/85 AA, 56 F, 41 R, 192/47; 188/82.9, 30, 82.1, 369

[56] References Cited
UNITED STATES PATENTS

| | | | |
|---|---|---|---|
| 2,766,864 | 10/1956 | Schilling et al. | 192/85 AA |
| 2,865,481 | 12/1958 | Teramala | 192/91 A |
| 3,027,986 | 4/1962 | Richmond | 192/41 R |
| 3,557,635 | 1/1971 | Tuck | 192/56 F |

Primary Examiner—Benjamin W. Wyche
Attorney, Agent, or Firm—Robert L. Zieg

[57] ABSTRACT

A directionally sensitive control mechanism for a friction engaging device, for example a brake mechanism, adapted to be used in an automatic transmission wherein automatic ratio changes are to be made. The directionally sensitive control mechanism comprises an hydraulic motor having a piston with a fluid chamber on one side thereof which is adapted to engage the friction device. The control mechanism includes a lever and ball mounted in a pocket in the piston on the opposite side thereof from said chamber. The ball is in contact with a rotatable friction plate of the device and with said lever, said lever being in contact with said check valve; whereby when the piston moves to engage the friction device, in one direction of relative rotation between said plate and said piston, said ball will hold said lever in a position to keep open said check valve so that the brake cannot be fully engaged until the direction of relative rotation reverses.

8 Claims, 4 Drawing Figures

ONE WAY FLUID OPERATED COUPLING

SUMMARY OF THE INVENTION

In present control systems for automatic transmissions, certain shifts to be made in the transmission are difficult to accomplish in a smooth manner. Particularly, it is found that downshifts wherein a friction device is to be engaged, as for example, a friction brake of the disc type are difficult to control. The friction element, to be disengaged can be disengaged before the friction element to be engaged is fully engaged, allowing the engine to speed up under no load. If the device to be engaged, engages at the proper engine speed as engine speed is increasing, a smooth shift will occur. However, if the engine speed increases beyond the proper point before engagement, a very rough shift will occur.

Several signals which can normally be used as control functions in shifting will not solve the problem of timing these difficult shifts, as for example, vehicle speed or throttle position. There are, however, two characteristics which can be used to time such a shift. One of these characteristics is engine speed. Most automatic transmissions, however, do not use an engine speed signal in the control system. A second signal is available under conditions where a friction brake is to be engaged, this being a torque reversal occurring in the brake mechanism when it is engaged. The most recognized and simple way to utilize the torque reversal signal is the use of a one-way engaging device to engage as the torque reversal occurs. This method, however, is expensive and adds several elements to the transmission. Other solutions have been known using complex valve systems to sense direction of rotation of elements to replace the one-way engaging device. However, it has been found that these devices do not operate with a quick enough response time to complete engagement of the brake before engine overspeed occurs.

The present invention comprises an improved control valve structure which operates to pre-position the apply element for the friction device which may, for example, be a brake piston, to partially engage the friction device so that when the torque reversal occurs the device will enable rapid engagement of the friction device to prevent engine over-speeding.

The present invention employs a simple check valve structure and an actuating mechanism therefor. The check valve can be released at times to prevent pressure build up on the fluid piston in response to the position of an actuating ball which is in contact with one of the friction plates. The ball is free to move to a non-effective position if the friction plates are moving in a certain direction with respect to the element housing the piston. When the friction elements are rotating in the opposite direction the movement of the ball will force the check valve to open to prevent full engagement of the friction device until the torque reversal or directional change of the friction elements occurs, at which time the actuating ball will be moved from its position of holding the check valve open to its other position, allowing the check valve to close and the friction device will be engaged immediately to prevent engine over-speeding in a very simple and convenient manner.

BRIEF DESCRIPTION OF THE DRAWINGS

Other advantages of the present invention will be more apparent from the following descriptions and drawings in which

Referring to FIG. 1, there is shown a friction engaging device 10 adapted to provide a driving connection between an element 12 and an element 14 of a transmission. For purposes of illustration, the friction engaging mechanism disclosed is a brake mechanism, the element 12 being stationary and the element 14 being held stationary when the device 10 is engaged. The engaging device includes a control valve mechanism 16 to control engagement of the friction device in response to reversal of direction of relative rotation of the parts. Provided in the element 12 is an hydraulic motor including a cylinder 18 which has slidable therein a piston 20 which is adapted to be moved to the right as viewed in FIG. 1 to engage the friction device 10. A return spring 21 is provided, held in place by a retainer 23, in engagement with piston 20. The piston, together with cylinder 18 defines a pressure chamber 22 adapted to receive fluid pressure from a passage (not illustrated) to move the piston 20 to engage device 10. The spring 21 returns piston 20 to its position illustrated in FIG. 1 when device 10 is disengaged.

Figure 1:
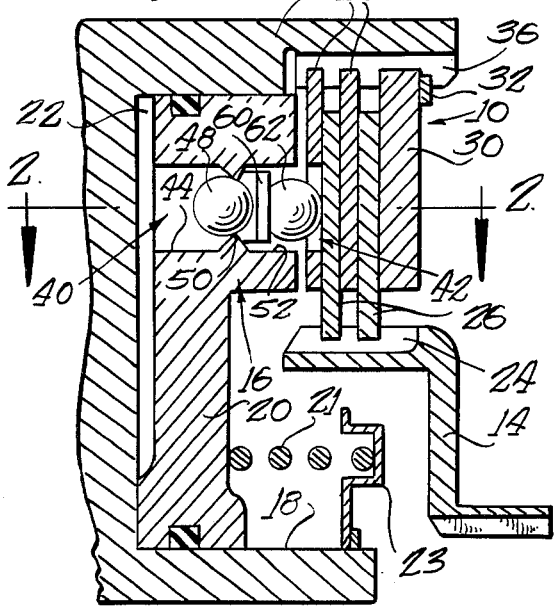
FIG. 1 is a partial cross-sectional view through a servo motor for a friction engaging device.

The transmission element 14 has splines 24 thereon which engage with mating teeth on rotatable friction plates 26 of the engaging device 10. The friction plates 26 may or may not have a friction lining thereon depending upon the use for which the friction device is constructed. Interleaved with the friction plates 26 are separator plates 28 and a reaction plate 30 is provided held in place by snap ring 32. The separator plates 28 and reaction plate 30 have teeth 34 thereon engaged with splines 36 provided on element 12.

In general, the piston 20 is actuatable to force the separator and friction plates tightly together to engage friction device 10 to connect transmission element 14 to element 12 in response to fluid pressure in chamber 22. Control mechanism 16 of the present invention includes a check valve 40 and an actuating mechanism 42 therefor. The check valve 40 comprises a bore 44 formed in piston 20 which defines a seat 46 adapted to receive a ball 48. The seat 46 surrounds a bore 50 which leads into a pocket 52 formed in the side of the piston away from chamber 22. The pocket 52 is open to the sump of the transmission. When ball 48 is in engagement with seat 46, a fluid seal is made therewith so that fluid pressure in chamber 22 can act on piston 20 to move it to the right. Actuating mechanism 42 comprises a lever 60 which in a preferred form may be flexible as in the nature of a leaf spring or may be of relatively inflexible section. An actuator ball 62 is positioned in engagement with the lever 60 and the closest friction plate 26. The ball 62 is received within an aperature 64 formed in separator plate 28 so that a lost motion connection is provided between separator plate 28 closest to piston 20 and ball 62.

Figure 2:
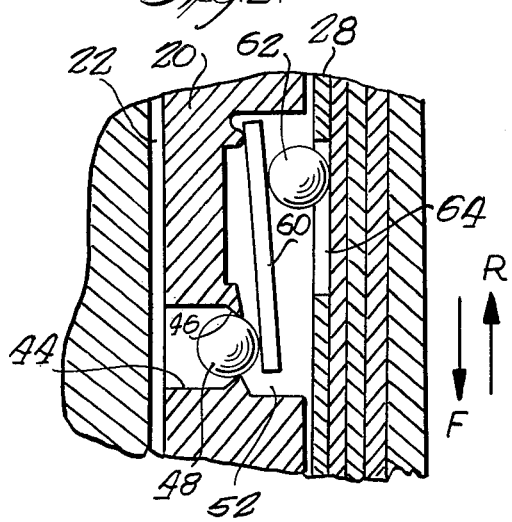
FIG. 2 is a partial sectional view taken along the lines 2—2 of FIG. 1.
Figure 3:
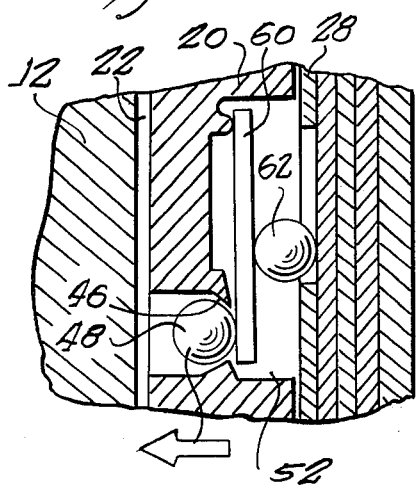
FIG. 3 is a view similar to 2 showing the parts in a different position.
Figure 4:
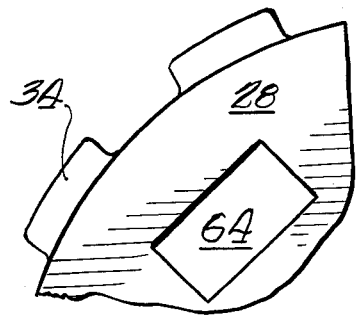
FIG. 4 is a partial end view of a friction plate.

The ball 62 may occupy the position illustrated in FIG. 2 or the position illustrated in FIG. 3 depending upon the conditions within the engaging device 10 at a given time. As will be apparent from the construction described, when the ball 62 is in the position of FIG. 2 which may be described as its non-actuating position, fluid pressure can move ball 48 to the position illustrated into engagement with seat 46 to provide a fluid seal and allow piston 20 to be acted upon by fluid pressure in chamber 22 to engage friction device 10. When ball 62 occupies the position of FIG. 3 the ball 48 will be held off the seat 46 by the lever 60 so that fluid pressure in chamber 22 cannot fully engage friction device 10 since a path is provided through the bore 50 and pocket 52 to sump.

As disclosed in FIGS. 2 and 3, the lever 60 may be loosely received within the pocket 52, the pocket 50 being dimensioned so that lever 60 cannot escape therefrom. Thus, there is no necessity of securing the lever 60 to the piston 20.

Assuming that the friction engaging device 10 is a brake mechanism with the transmission element 12 being fixed, and the device comprising the second speed brake for an automatic transmission, as for example, brake 24 of FIG. 1 of U.S. Pat. No. 3,724,626. The device 10 must be actuated for the 1–2 shift, normally termed the 1–2 upshift and must also be engaged for the 3–2 shift, normally described as the 3–2 downshift. When the device 10 is to be engaged during the 1–2 shift the part 14 will be rotating and plates 26 therewith in direction directed indicated of the arrow labeled R in FIG. 2. The brake piston will be in its released position as illustrated in FIG. 1. There is no load at this time on the lever 60 and the check valve 48 is not moved from its seat 46. At this time the actuating ball 62 of the actuator 42 could be either in its FIG. 2 or FIG. 3 position. As the brake piston begins to bring the plates 28 and 26 of the device 10 into engagement, the actuating ball 62 will be in contact with the closest friction plate 26 and due to the direction of rotation of the plate 26 will be moved to the FIG. 2 position or the non-actuating position which will allow ball 48 to seat and the piston completes the engagement of device 10.

After the transmission is in third gear and a shift is to be made to second gear, described above as the 3–2 shift, in a condition where the engine is transmitting power known as a part-throttle downshift, the fluid pressure in chamber 22 will seat ball 48 and the piston will be moved into engagement with the closest plate 28 and move the plates 28 and 26 into initial engagement. The plates 26 under these conditions will be moving in the direction of the arrow labeled F in FIG. 2, thus moving actuating ball 62 to its actuated position illustrated in FIG. 3. Ball 62 acts to create a sufficient force on lever 60 to lift ball 48 from its seat. This will prevent any further rise in brake piston pressure. Since there is normally a restriction in the line feeding chamber 22 the pressure will remain constant at this point and the piston will stay in the position that it has assumed at this time. However, at the point at which the friction plates begin to reverse their direction and move in the direction of the arrow labeled R which indicates the point at which the engine is at its proper speed to complete the shift, ball 62 will be rolled from its actuating position illustrated in FIG. 3 to its non-actuating position illustrated in FIG. 2. The ball 48 is allowed to seat and since the friction plates 26 and 28 are in initial contact and the fact that there is an existing pressure in chamber 22 the pressure rises to obtain sufficient engaging force to hold the torque required between plates 26 and 28 will be almost instantaneous. Thus, the very difficult 3–2 part-throttle shift is completed with the aid of the directionally sensitive control valve 16, without the necessity of adding an expensive one-way engaging device or other more complicated control mechanisms.

If a downshift is to be made by the control system under closed-throttle conditions, i.e. when the engine is at idle, no torque reversal will occur when the downshift is completed. The control valve 16 under these conditions, will prevent the brake from being fully applied and the friction device 10 would simply slip until torque is again transmitted through the gear set to allow the ball 48 to seat and provide full engagement of device 10.

The various features of the invention have been particularly shown and described, however, it should be obvious to one skilled in the art that modifications may be made therein without departing from the scope of the invention.

I claim:

1. A control mechanism for an hydraulic motor for a friction engaging device including a piston member, a cylinder member receiving said piston, said piston and cylinder defining a fluid chamber, a valve in one of said members, fluid pressure in said chamber acting to close said valve, an actuator for said valve, rotatable means in said friction engaging device having relative rotation with respect to one of said members, one part of said actuator being in contact with said rotatable means, and a second part of said actuator having contact with said valve whereby in one direction of said relative rotation said valve will be opened by said actuator and in the other direction of relative rotation said valve will remain closed.

2. A control mechanism as claimed in claim 1 wherein said valve is mounted in said piston member.

3. A control mechanism as claimed in claim 1 wherein said rotatable means comprises a rotatable friction plate.

4. A control mechanism as claimed in claim 1 wherein said one part is a ball.

5. A control mechanism for an hydraulic motor for a friction brake including a piston, a cylinder receiving said piston, said piston and cylinder defining a fluid chamber, a check valve in said piston, fluid pressure in said chamber acting to close said check valve, an actuator for said check valve, at least one friction plate in said brake having relative rotation with respect to said piston, one part of said actuator being in contact with said plate, and a second part of said actuator having contact with said check valve whereby in one direction of relative rotation said check valve will be opened by said actuator and in the other direction of relative rotation said check valve will remain closed.

6. A control mechanism as claimed in claim 5 wherein said piston has a pocket formed therein in which said actuator is carried.

7. A control mechanism as claimed in claim 6 wherein said one part is a ball and said second part is a lever.

8. A directionally sensitive control mechanism for an hydraulic motor for a friction brake including a piston, a cylinder receiving said piston, said piston and cylinder defining a fluid chamber, a check valve in said piston in communication with said chamber, fluid pressure in said chamber acting to close said check valve, an actuator for said check valve comprising a ball and lever carried in a pocket in said piston, said check valve adapted to connect said chamber to said pocket when open, said brake including at least one friction plate having relative rotation with respect to said piston, said ball being in contact with said friction plate, said lever having contact with said check valve whereby in one direction of relative rotation between said piston and said plate said check valve will be opened by said lever and in the other direction of relative rotation said check valve will remain closed, whereby under certain conditions of relative rotation said brake cannot be fully engaged until the direction of relative rotation is reversed providing a smooth engagement of said brake.

* * * * *